April 1, 1941.   O. C. KOPPEN   2,237,275
AIRPLANE WING
Filed Oct. 9, 1939   2 Sheets-Sheet 1
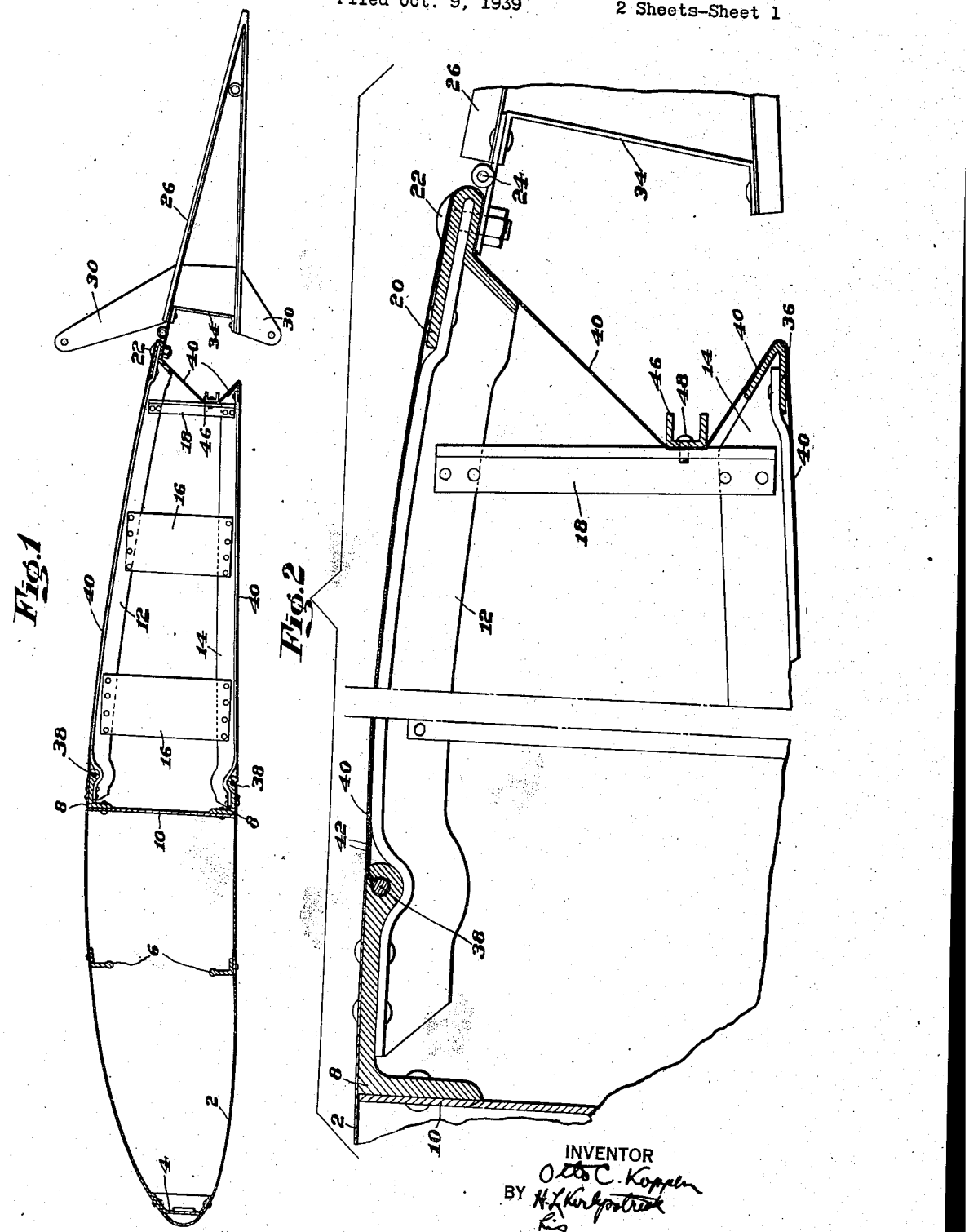

April 1, 1941.　　　O. C. KOPPEN　　　2,237,275
AIRPLANE WING
Filed Oct. 9, 1939　　　2 Sheets-Sheet 2
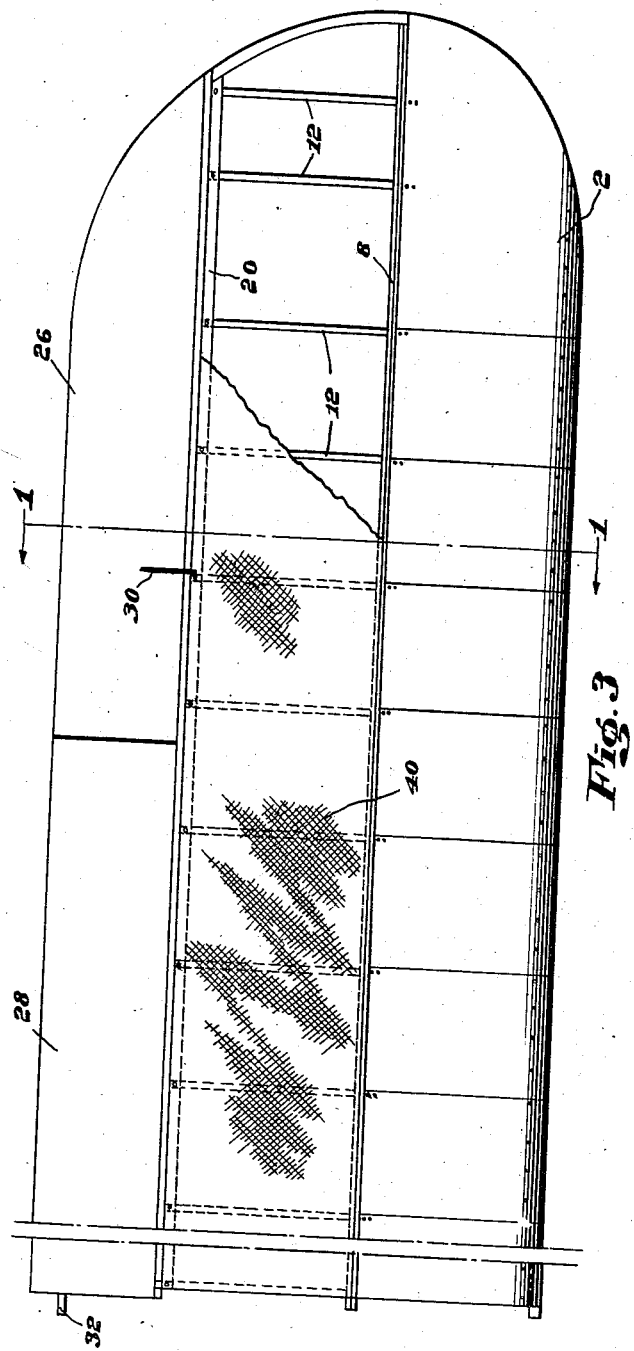
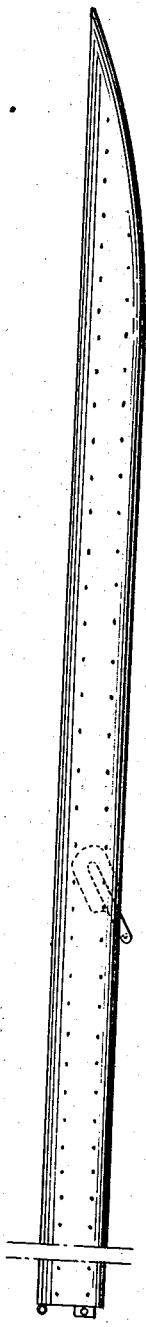
INVENTOR
Otto C. Koppen
BY H. L. Kirkpatrick
ATTORNEY Patented Apr. 1, 1941

2,237,275

UNITED STATES PATENT OFFICE 2,237,275

AIRPLANE WING

Otto C. Koppen, Newton, Mass., assignor, by mesne assignments, to General Aircraft Corporation, Dover, Del., a corporation of Delaware Application October 9, 1939, Serial No. 298,578

10 Claims. (Cl. 244—123)

This invention relates to a novel airplane wing structure and has for its object to provide an improved airplane wing of metal and fabric construction which is not only adequately strong structurally but also easily, cheaply and quickly constructed by reason of the novel features thereof as hereinafter more fully described. The construction, moreover, provides such advantages not only in initial assembly but also in such disassembly and reassembly as may be required for any inspection, repair, or replacement of either metal or fabric components.

In the drawings:

Fig. 1 is a transverse cross-sectional view of the wing and aileron, partly in side elevation, taken on line 1—1 of Fig. 3;

Fig. 2 is an enlarged cross-sectional and elevational view of portions of Fig. 1, as shown therein;

Fig. 3 is a top plan view of the wing with a portion of the fabric broken away; and Fig. 4 is a front elevation of the wing as shown in Fig. 3.

Referring to the drawings in which like numerals represent like parts, the wing there shown represents a preferred example of the invention as embodied in a small commercial airplane of high-wing monoplane type and having a conventional airfoil for such purpose. It will be plain, however, that the invention is useful for and may be embodied in various high performance types differing in airfoil, wing taper, and other design details, without departing from the spirit and substance of the invention, or whether the wings thereof be cantilever, or strut braced as herein shown and described.

The invention involves a metal wing structure having spar and rib portions in which the exposed portion of the spar is formed of sheet metal 2 providing a stressed skin of airfoil contour internally braced at the leading edge by a member 4 extending longitudinally of the leading edge, and internally braced top and bottom by bulb angles 6 likewise extending longitudinally of the wing. At the rear longitudinal edges of the spar, the skin 2 is internally braced by fixed longitudinally extending angles 8 of special form as hereinafter more fully described, said angles being vertically spaced by a longitudinally extending plate 10, all of said longitudinally extending members 4, 6, 8, and 10 being suitably affixed to the skin 2 as by bolts, or preferably, by rivets as shown, so that the entire assembly including the external stressed skin 2 is stiffened, thereby forming the spar member. Also affixed to the angles 8 are rearwardly extending rib members including upper rib members 12 and lower rib members 14, both being preferably of T section with flanges facing outwardly, which flanges are riveted to the respective upper and lower angles 8 as shown, and are spaced by plates 16 and angle 18 near the terminal ends of the same, the plates 16 and the angle 18 being riveted to the vertical or stem portions of the T-shaped ribs as shown. Extending longitudinally of the rearward edge of the wing proper and connecting together the rib portions 12 is a shaped member 20 suitably affixed to the member 12 as by rivets, and also by bolts 22 which also form a means of attachment of a piano hinge 24 riveted to and hingedly connecting the aileron 26 and flap 28, the ailerons being provided with horns 30 for the actuation thereof and the flap 28 being provided with a member 32 by means of which the flap position may be controlled. In the wing, as shown, the flap and aileron extend the entire length of the trailing edge of the wing.

In the aileron as shown, the aileron itself is formed from a V section of corrugated sheet metal with the forward edges of the V spaced by means of a channel 34 riveted at the top by hinge connecting rivets and at the bottom by additional rivets spacing the forward edges of the aileron the required vertical distance. As a practical matter, the flap may be and preferably is hingedly affixed in essentially the same manner as described in connection with the aileron.

Referring again to the wing proper, the rearwardly extending ends of the flanges of the lower rib portions 14 are riveted as shown to a V shaped member 36 extending longitudinally of the wing so that each rib member both at the forward and rear ends thereof is firmly attached to a member extending longitudinally of the wing.

Referring again to the angle members 8, these are preferably made as shown, of an extruded shape having integral near the rear edge thereof an outwardly facing longitudinal slotted opening into a substantially cylindrical recess having a diameter substantially larger than the width of said slotted opening, each said recess having therein a round rod 38 of a diameter sufficiently smaller than the diameter of said cylindrical recess so as to permit the two thicknesses of the hemmed edge of the cloth covering 40 to be snugly held therein, the hem itself being held by means of the stitches 42 as indicated. It will also be noted that the angle 8 presents to the cloth a smooth rounded edge so that the cloth may be firmly held and tightened without any undue localized stress. The fabric covering and the rods therefor preferably extend in a single length the entire length of the wing as shown in Fig. 3. In assembly, the hem of the cloth is first inserted in the slot and then the rod 38 thrust longitudinally of the circular recess so that the rod throughout the length of the wing holds the hem in place at each angle 8 above and below the wing at the upper and lower rear edges, respectively, of the spar. It will be seen that a continuous width of the cloth 40 extends smoothly from the recess in the upper angle 8 rearwardly along each upper rib 12, to which it may be suitably attached as by rib stitching (not shown), around the outside of the shape 20, and angle member 36, and then forwardly and smoothly into the recess of the lower angle 8, the cloth being of such a predetermined hemmed width that after assembling as described it may be snugly stretched by forcing in place the longitudinal channel member 46, which is then affixed to the angles 18 by means of screws 48 upon stretching the cloth 40, following which the cloth covering is "doped" and shrunk in situ, as well known in the art, thus providing a fabric covering which extends "cleanly" from the rear edges of the spar. Though a mechanical fabric tightening means of the type illustrated is preferred, it may be materially changed from that as shown.

It is also contemplated that the longitudinal circular recesses or channels may be formed in other than the angles 8, for example, they may be rolled in the edges of the leading-edge skin (preferably reenforced) or in rearwardly extending flanges of a channel substituted for the plate 10, or in other longitudinal members stiffening the rear edges of the spar.

Though the wing as shown includes a flap, this, of course, may be entirely omitted, or instead, a split type of flap be employed, though with necessary changes in the attachment of the fabric at such portion of the wing if no flap or different flap than that shown be employed. If the flap be thus changed or omitted, the fabric then may be carried to or about the ends of the ribs (extended to the trailing-edge) and longitudinal trailing-edge member.

It will thus be seen that there is provided a wing which attains the objects of the invention as above set forth and which may be employed to entirely do away with welding in wing structure, though, if desired, various component parts hereof may be welded as by spot-welding to form the spar and rib members. In either event, the parts employed in the assembly may be readily jigged, cut, drilled and shaped and thus be ready for rapid assembly, followed by especially rapid attachment of the cloth cover around the rib portion of the wing.

Having described my invention, what I claim is:

1. An airplane wing having, in combination, a metal stressed-skin of a form providing an airfoil leading-edge section, a series of longitudinally-extending internal metal bracing members attached to said skin, structural means connected to and separating and vertically spacing the longitudinal rear edges of said skin, the foregoing elements together providing a hollow metal spar section, a rib section including upper and lower vertically-spaced individual metal rib members attached to and extending rearwardly respectively from the upper and lower rear edges of said spar, means attached to and vertically spacing said upper and lower rib members, a longitudinal member connecting the rear ends of said upper rib members, an aileron, hinge means affixed to the rib section adjacent said longitudinal member, and to said aileron, a fabric covering with hemmed edges, said covering extending rearwardly from the upper rear edge of said spar continuously around said ribs and rib-connecting member to the lower rear edge of said spar, a longitudinally recessed member affixed to the wing adjacent each of the rear edges of said spar, each providing a longitudinal slotted re-entrant recess with an outwardly disposed restricted opening receiving one of said hemmed edges, a longitudinal retaining member within each said hem and recess holding said hemmed edge therein, and mechanical fabric-tightening means intermediate the width of said covering, said means being affixed adjacent the rear edge of said rib section.

2. An airplane wing having, in combination, a metal stressed-skin of a form providing an airfoil leading-edge section, a series of longitudinally-extending internal metal bracing members attached to said skin, structural means connected to and separating and vertically spacing the longitudinal rear edges of said skin, the foregoing elements together providing a hollow metal spar section, a rib section including upper and lower vertically-spaced individual metal rib members attached to and extending rearwardly respectively from the upper and lower rear edges of said spar, means attached to and vertically spacing said upper and lower rib members, upper and lower longitudinal members connecting the rear ends respectively of said upper and lower rib members, an aileron, hinge means affixed to the rib section adjacent the uppermost of said longitudinal members, and to said aileron, a fabric covering with hemmed edges, said covering extending rearwardly from the upper rear edge of said spar continuously around said ribs and rib connecting members to the lower rear edge of said spar, a longitudinally recessed member affixed to the wing adjacent each of the rear edges of said spar, each providing a longitudinal slotted re-entrant recess with an outwardly disposed restricted opening receiving one of said hemmed edges, a longitudinal retaining member within each said hem and recess holding said hemmed edge therein, and fabric-tightening means intermediate the width of said covering and externally thereof, said means being affixed adjacent the rear end of said rib section.

3. An airplane wing having, in combination, a metal stressed-skin of a form providing an airfoil leading-edge section, a series of longitudinally-extending internal metal bracing members attached to said skin, structural means connected to and separating and vertically spacing the longitudinal rear edges of said skin, a longitudinally recessed angle member affixed to the wing adjacent to and stiffening each of said rear edges and each providing a longitudinal slotted re-entrant recess with an outwardly disposed restricted opening, the foregoing elements together providing a hollow metal spar, a rib section comprising upper and lower vertically spaced individual metal rib members attached to and extending rearwardly respectively from the upper and lower rear edges of said spar, means attached to and vertically spacing said upper and lower rib members, upper and lower longitudinal members connecting the rear ends respectively of said upper and lower rib members, an aileron, hinge means affixed to the rib section adjacent the uppermost of said longitudinal members, and to said aileron, a fabric covering with hemmed edges, said covering extending rearwardly from the upper rear edge of said spar continuously around said ribs and rib connecting members to the lower rear edge of said spar, each of said slotted re-entrant recesses receiving one of said hemmed edges, a longitudinal retaining member within each said hem and recess holding said hemmed edge therein, and mechanical fabric-tightening means intermediate the width of said covering, said means being affixed adjacent the rear ends of said rib members.

4. An airplane wing having, in combination, a metal stressed-skin of a form providing an airfoil leading-edge section, a series of metal longitudinal internal bracing members attached to said skin at the forward and central portions thereof, structural means connected to and separating and vertically spacing the longitudinal rear edges of said skin, a longitudinally recessed angle member affixed to the wing adjacent to and stiffening each of said rear edges with the recess at the edge of the flange of said angle member and opening outwardly thereof, the foregoing elements together providing a hollow metal spar, a rib section comprising upper and lower individual metal rib members attached to and extending rearwardly respectively from the upper and lower rear edges of said spar, a longitudinal member connecting the rear ends of said upper rib members, an aileron, hinge means affixed to the rib section adjacent said longitudinal member, and to said aileron, a fabric covering with hemmed edges, said covering extending rearwardly from the upper rear edge of said spar continuously around said ribs and rib connecting member to the lower rear edge of said spar, each of said longitudinally recessed members providing a slotted re-entrant recess receiving one of said hemmed edges, a longitudinal retaining member within each said hem and recess holding said hemmed edge therein, and mechanical fabric-tightening means intermediate the width of said fabric and adjacent the rear ends of said rib members.

5. An airplane wing having, in combination, a metal stressed-skin of a form providing an airfoil leading-edge section, a series of metal longitudinal internal bracing members attached to said skin at the forward and central portions thereof, structural means connected to and separating and vertically spacing the longitudinal rear edges of said skin, a longitudinally recessed member affixed to the wing adjacent to each of said rear edges with the recess opening outwardly, the foregoing elements together providing a hollow metal spar, a rib section comprising upper and lower individual metal rib members attached to and extending rearwardly respectively from the upper and lower rear edges of said spar, a longitudinal member connecting the rear ends of said upper rib members, an aileron and flap, hinge means affixed to the rib section adjacent said longitudinal member, and to said aileron and flap, said aileron and flap together constituting substantially the entire trailing-edge of said wing, a longitudinal member connecting the rear ends of said lower rib members, a fabric covering with hemmed edges, said covering extending rearwardly from the upper rear edge of said spar continuously around said ribs and rib connecting members to the lower rear edge of said spar, each of said longitudinally recessed members providing a slotted re-entrant recess receiving one of said hemmed edges, a longitudinal retaining member within each said hem and recess holding said hemmed edge therein, and mechanical fabric-tightening means consisting of a longitudinal member disposed intermediate the width and externally of said fabric covering and means for affixing the same adjacent said rear ends and opposite said aileron and flap.

6. An airplane wing having, in combination, a metal stressed-skin of a form providing an airfoil leading-edge section, a series of metal longitudinally extending internal bracing members attached to said skin, structural means connected to and separating and vertically spacing the rear edges of said skin, a longitudinally recessed member affixed to said means and skin adjacent each of said rear edges, each said member providing a longitudinal slotted re-entrant recess with an outwardly disposed restricted opening, the foregoing elements together providing a hollow metal spar, a rib section comprising upper and lower individual metal rib members attached to and extending rearwardly respectively from the upper and lower rear edges of said spar, metallic means bracing and vertically spacing said upper and lower rib members, longitudinal members connecting together the rear ends respectively of said upper and lower rib members, an aileron and flap, hinge means affixed to the rib section adjacent the uppermost of said longitudinal members, and to said aileron and flap, said aileron and flap together constituting substantially the entire trailing edge of said wing, a fabric covering with hemmed edges, said covering extending rearwardly from the upper rear edge of said spar continuously around said ribs and rib-connecting members to the lower rear edge of said spar, each of said longitudinal re-entrant recesses receiving one of said hemmed edges, a longitudinal retaining member within each said hem and recess holding said hemmed edge therein, and mechanical fabric-tightening means consisting of a longitudinal member disposed externally of said fabric covering and intermediate the width thereof, and means for detachably affixing the same to the rearmost of said metallic rib-spacing means adjacent said upper and lower rear ends and opposite said aileron and flap.

7. In an airplane wing having a spar section with vertically spaced rear edges, a rearwardly extending section connected thereto and including vertically spaced individual rib members, bracing members, and a fabric covering with hemmed edges, the foregoing elements together providing an airfoil, members mounted in said wing adjacent said spar section, constructed to provide a longitudinal recess adjacent each external line of juncture of said two wing sections, each said recess having a restricted outwardly disposed opening arranged longitudinally of said wing and receiving one of said hemmed edges, a removable longitudinal retaining member within each said hem and recess holding said hemmed edge therein, and mechanical means for tightening said fabric covering consisting of a longitudinal member disposed externally of said covering and intermediate the width thereof, and means for affixing the same to said rearwardly extending section.

8. In an airplane wing having a spar section with vertically spaced rear edges, a rearwardly extending ribbed section connected thereto, and having a fabric covering with hemmed edges, the foregoing elements together providing an airfoil, members mounted in said wing adjacent said spar section, constructed to provide a longitudinal recess adjacent each external line of juncture of said spar and ribbed sections, each said recess having a restricted outwardly disposed opening arranged longitudinally of said wing and receiving one of said hemmed edges, a removable longitudinal retaining member within each said hem and recess holding said hemmed edge therein, and mechanical fabric-tightening means intermediate the width of said fabric covering and mounted on said rearwardly extending section.

9. In an airplane wing having a spar section with vertically spaced rear edges, a rearwardly extending section connected thereto and including ribs and a fabric covering with hemmed edges, an aileron and flap, hinge means attached to said rear section, and to said aileron and flap, said aileron and flap together constituting substantially the entire trailing edge of said wing, the foregoing elements together providing an airfoil, members mounted in said wing adjacent said spar section, constructed to provide a longitudinal recess adjacent each external line of juncture of said two wing sections, each said recess having a restricted outwardly disposed opening arranged longitudinally of said wing and receiving one of said hemmed edges, a removable longitudinal retaining member within each said hem and recess holding said hemmed edge therein, and mechanical fabric-tightening means intermediate the width of said covering consisting of a longitudinal member disposed externally of said covering and means for affixing the same to said rear section intermediate the rear ends of said ribs and opposite said aileron and flap members.

10. In an airplane wing construction, an airfoil leading-edge section with a sheet metal exterior skin, a longitudinal spar member connected to and separating and vertically spacing the longitudinal rear edges of said skin, a longitudinally extending recessed member mounted in the wing adjacent each of said rear edges with the recess opening outwardly, the foregoing elements together providing a leading-edge section, a rib section comprising upper and lower individual rib members attached to and extending rearwardly respectively from the upper and lower rear edges of said leading-edge section, a longitudinal member connecting the rear ends of said upper rib members, an aileron, hinge means affixed to the rib section adjacent said longitudinal member, and to said aileron, a longitudinal member connecting the rear ends of said lower rib members, a fabric covering with hemmed edges extending rearwardly from the upper rear edge of said leading-edge section continuously around said ribs and rib connecting members to the lower rear edge of the same, each of said longitudinally recessed members being constructed to provide a slotted re-entrant recess receiving one of said hemmed edges, a longitudinal retaining member within each said hem and recess holding said hemmed edge therein, and mechanical fabric-tightening means intermediate the width of said fabric covering consisting of a longitudinal member disposed externally of said covering and means for affixing the same to the rib section adjacent said rear ends and opposite said aileron.

OTTO C. KOPPEN.